United States Patent
Chamberlain

(10) Patent No.: US 10,620,091 B2
(45) Date of Patent: Apr. 14, 2020

(54) ELECTRONIC CONTROL SYSTEM TESTER

(71) Applicant: HAMILTON SUNDSTRAND CORPORATION, Charlotte, NC (US)

(72) Inventor: Mark A. Chamberlain, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 236 days.

(21) Appl. No.: 15/816,873

(22) Filed: Nov. 17, 2017

(65) Prior Publication Data
US 2019/0154544 A1 May 23, 2019

(51) Int. Cl.
| | | |
|---|---|---|
| G01L 27/00 | (2006.01) | |
| G01M 15/14 | (2006.01) | |
| F02C 3/04 | (2006.01) | |
| F02C 9/24 | (2006.01) | |
| F02C 9/28 | (2006.01) | |
| G05B 13/04 | (2006.01) | |
| G05D 1/08 | (2006.01) | |

(52) U.S. Cl.
CPC ............... *G01M 15/14* (2013.01); *F02C 3/04* (2013.01); *F02C 9/24* (2013.01); *F02C 9/28* (2013.01); *G01L 27/005* (2013.01); *G05B 13/04* (2013.01); *G05D 1/0858* (2013.01); *F05D 2270/301* (2013.01)

(58) Field of Classification Search
CPC .................................................... G01L 27/005
See application file for complete search history.

(56) References Cited

U.S. PATENT DOCUMENTS

| | | | |
|---|---|---|---|
| 4,658,829 A | 4/1987 | Wallace | |
| 6,094,624 A | 7/2000 | Chao | |
| 8,855,853 B2 | 10/2014 | Blair | |
| 2004/0016465 A1 | 1/2004 | Wingert et al. | |
| 2004/0217068 A1* | 11/2004 | Kirby | B01F 3/0446 210/760 |
| 2004/0261796 A1* | 12/2004 | Butler | A61G 10/026 128/205.26 |
| 2014/0338421 A1 | 11/2014 | Muller et al. | |

FOREIGN PATENT DOCUMENTS

| | | |
|---|---|---|
| WO | 9107712 | 5/1991 |
| WO | 2005085789 | 9/2005 |

OTHER PUBLICATIONS

European Patent Office, European Search Report dated Mar. 18, 2019 in Application No. 18193796.2.

* cited by examiner

*Primary Examiner* — Peter J Macchiarolo
*Assistant Examiner* — Alex T Devito
(74) *Attorney, Agent, or Firm* — Snell & Wilmer, L.L.P.

(57) ABSTRACT

A pressure simulator is disclosed. The pressure simulator may include a supply inlet, a venturi coupled to the supply inlet by a supply conduit, the venturi including a vacuum output, and a first simulator output coupled to the vacuum output by a vacuum conduit. The venturi is configured to receive a compressed gas from the supply inlet and to provide a vacuum to the first output via the vacuum conduit.

13 Claims, 4 Drawing Sheets

ELECTRONIC CONTROL SYSTEM TESTER

GOVERNMENT LICENSE RIGHTS

This disclosure was made with government support under FA8532-16-C-0004 awarded by the United Stated Air Force. The government has certain rights in the disclosure.

FIELD

The present disclosure relates to electronic control systems and, more particularly, to test equipment used to examine the operable status of electronic control systems used in gas turbine engines.

BACKGROUND

Electronic engine control (EEC) systems are used to control operation of gas turbine engines used on aircraft as well as other types of engines. Typical EEC systems receive inputs from the airframe or various locations of the engine to control various engine functions, such as inlet guide vanes, compressor stators, bleeds and fuel flow. Inputs to an EEC system may include pressure and temperature measurements at the fan, compressor, combustor, turbine and exhaust, throttle position, fuel flow and fan and spool speeds. Outputs from an EEC system are used to control the various engine functions in order to facilitate rapid and stable throttle response, protection from fan or compressor stalls or flame outs and to achieve improved thrust, performance at high altitudes and engine operation within limits over the flight envelope. Because the EEC system is responsible for proper operation of a gas turbine engine, it is important that the controller is configured correctly and operates properly. The present disclosure provides an apparatus used to test EEC systems.

SUMMARY

A pressure simulator is disclosed. In accordance with various embodiments, the pressure simulator includes a supply inlet, a venturi coupled to the supply inlet by a supply conduit and having a vacuum output, and a first simulator output coupled to the vacuum output by a vacuum conduit. The venturi is configured to receive a flow of compressed gas from the supply inlet and to provide a vacuum to the first simulator output via the vacuum conduit.

In various embodiments, a first switch is positioned downstream of the supply inlet and upstream of the venture. The first switch is configured to selectively connect the supply inlet to one of the venturi and the first simulator output. A first high pressure conduit connects the supply inlet to the first simulator output and a second high pressure conduit also connects the supply inlet to the first simulator output. A first pressure regulator is positioned downstream of the supply inlet and upstream of the venturi. A second pressure regulator is positioned within the second high pressure conduit and downstream of the first pressure regulator.

In various embodiments, a second switch is positioned downstream of the second pressure regulator and configured to selectively connect one of the vacuum conduit and the second high pressure conduit to the first simulator output via an output of the second switch. A third switch may be positioned downstream of the second switch and configured to selectively connect one of the output of the second switch and the first high pressure conduit to the first simulator output via an output of the third switch. A junction may be positioned downstream of the third switch. A first branch of the junction may connect to the first simulator output and a second branch of the junction may connect to a second simulator output via a second output conduit. A fourth switch may be positioned between the junction and the second simulator output, where the fourth switch is configured to selectively open or close access to the second simulator output via the second output conduit.

In various embodiments, the first pressure regulator is set to regulate pressure to a first pressure level and the second pressure regulator is set to regulate pressure to a second pressure level, where the first pressure level is greater than the second pressure level. A third pressure regulator is positioned downstream of the of the first pressure regulator and upstream of the venturi, and the third pressure regulator is set to regulate pressure to a third pressure level, where the third pressure level is set intermediate the first pressure level and the second pressure level. In various embodiments, a pressure relief valve is connected to the second output conduit downstream of the fourth switch. A snubber may also be positioned in the first high pressure conduit, while an accumulator may be positioned downstream of the third switch.

A portable apparatus for testing an electronic engine controller is disclosed. The portable apparatus includes a housing, a power supply module mounted within the housing, an interface test adaptor mounted within the housing and a pressure simulator. The pressure simulator includes a supply inlet, a venturi coupled to the supply inlet by a supply conduit, the venturi including a vacuum output, and a first simulator output coupled to the vacuum output by a vacuum conduit. In various embodiments, the venturi is configured to receive a compressed gas from the supply inlet and to provide a vacuum to the first simulator output via the vacuum conduit.

In various embodiments, the portable apparatus further includes a first high pressure conduit connecting the supply inlet to the first simulator output and a first switch positioned downstream of the supply inlet and upstream of the venture. The first switch may be configured to selectively connect the supply inlet to one of the venturi and the first simulator output. The first simulator output may be configured to supply one of a vacuum input and a positive pressure input to a sensor of an electronic engine controller. In various embodiments, a tank of compressed gas is connected to the supply inlet.

A portable apparatus for testing an electronic engine controller of a gas turbine engine is disclosed. The portable apparatus may include a housing, a power supply module mounted within the housing, an interface test adaptor mounted within the housing and a pressure simulator mounted within the housing. In various embodiments, the pressure simulator includes a supply inlet, a venturi coupled to the supply inlet by a supply conduit, the venturi including a vacuum output, a first simulator output coupled to the vacuum output by a vacuum conduit, a first high pressure conduit connecting the supply inlet to the first output, and a first switch positioned downstream of the supply inlet and upstream of the venturi, the first switch configured to selectively connect the supply inlet to one of the venturi and the first simulator output. The venturi is configured to receive compressed gas from the supply inlet and to provide a vacuum to the first simulator output via the vacuum conduit and the first simulator output is configured to supply one of a vacuum input and a positive pressure input to a sensor of an electronic engine controller.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
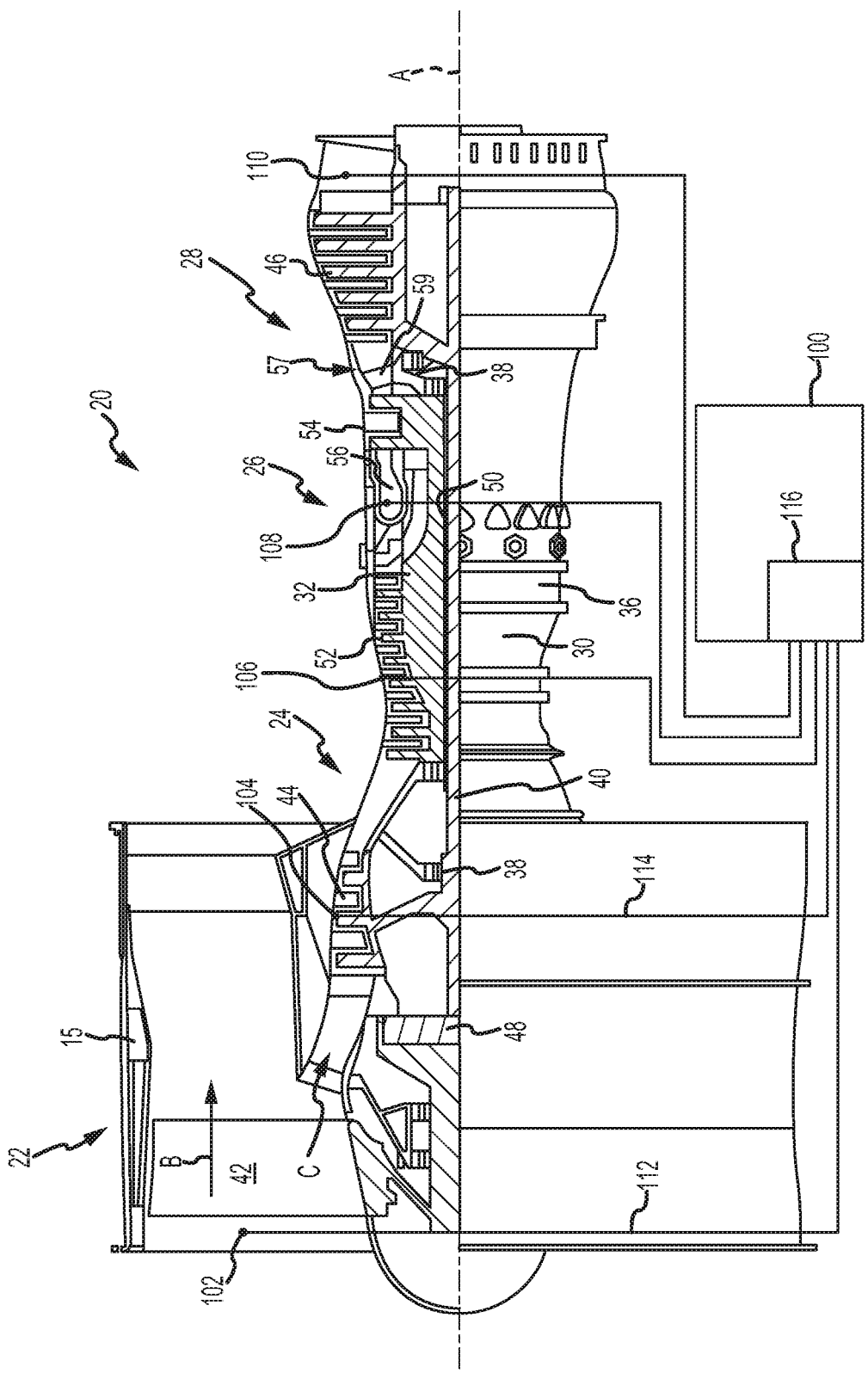
FIG. 1 is a schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of the bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via the bearing systems 38 about the engine central longitudinal axis A, which is collinear with their longitudinal axes.

The core airflow is compressed by the low pressure compressor 44 and then the high pressure compressor 52, mixed and burned with fuel in the combustor 56, and then expanded over the high pressure turbine 54 and low pressure turbine 46. The mid-turbine frame 57 includes airfoils 59 that are in the core airflow path C. The low and high pressure turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the gear system 48 may be located aft of the combustor section 26 or even aft of the turbine section 28, and the fan section 22 may be positioned forward or aft of the location of the gear system 48.

Still referring to FIG. 1, an electronic engine controller (EEC) 100 is illustrated. For purposes of this disclosure, the EEC is shown receiving pressure inputs from an upstream of the fan region 102, a low pressure compressor region 104, a high pressure compressor region 106, a combustor region 108 and an exhaust duct region 110. In various embodiments, the pressure inputs may be provided to the EEC 100 using conduits, such as a fan region conduit 112 and a low pressure turbine region conduit 114, with the pressure levels in the various conduits being read by pressure transducers or sensors 116 located in the EEC 100. In typical operations, various other types of data, such as temperature, fuel flow rates and spool speeds, are also routed as inputs to the EEC 100, with such other types of data, including pressure data, being taken from appropriate regions throughout the gas turbine engine 20. The EEC 100 then uses the input data to control the gas turbine engine 20 during operation.

Figure 2:
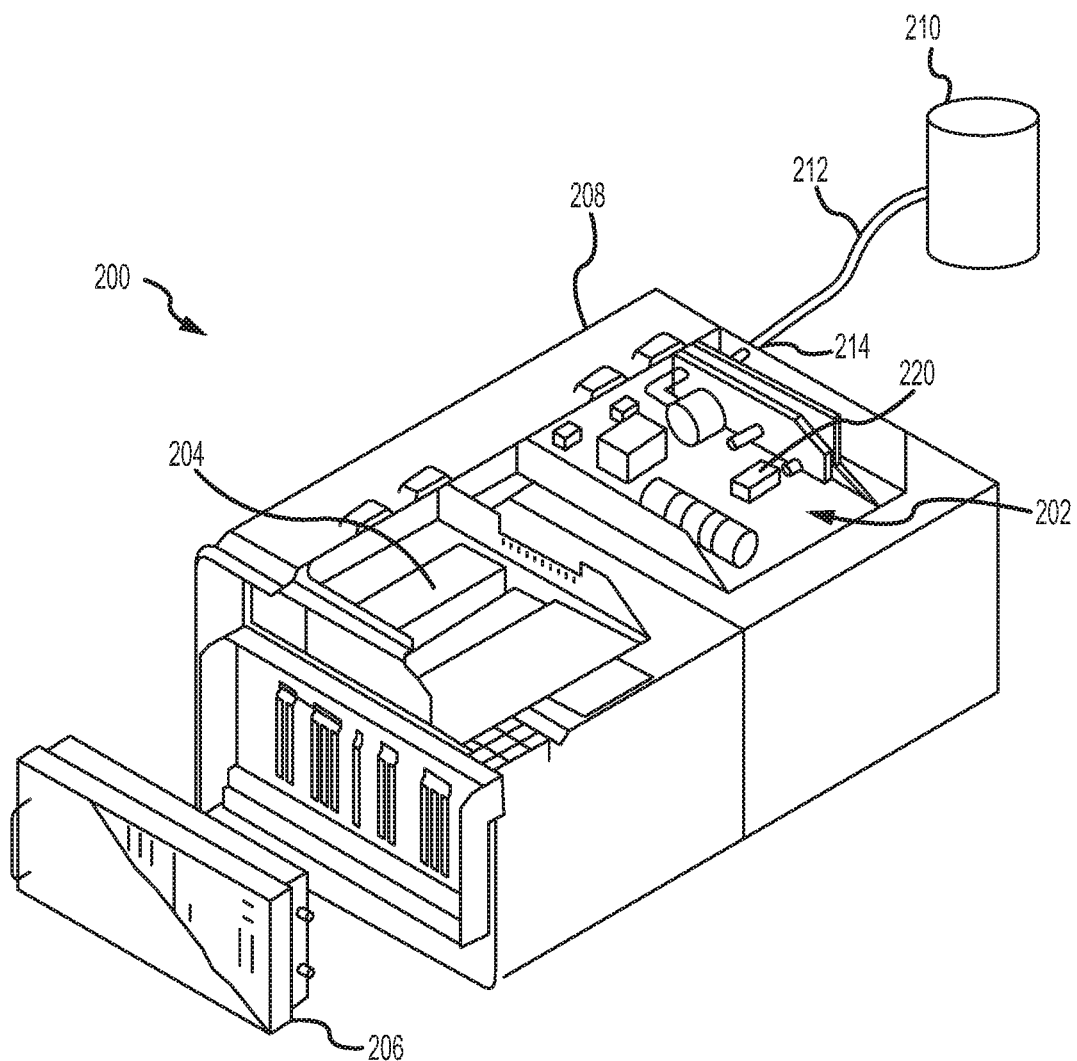
FIG. 2 illustrates a portable electronic engine controller tester, in accordance with various embodiments.

Referring now to FIG. 2, a perspective view of a portable EEC tester 200 in accordance with various embodiments is provided with partial cutaways showing various of the internal components. In various embodiments, the portable EEC tester 200 includes a pressure simulator 202, a power supply 204 and an interface test adaptor 206. The portable EEC tester 200 also includes a housing 208 for covering the various components identified above, together with related components and input/output circuitry. The interface test adaptor 206 provides an electronic interface between a unit under test—such as, for example, the EEC 100 illustrated in FIG. 1 or other devices used to control engine operation— and the portable EEC tester 200. The interface test adaptor, generally, includes one or more circuit cards configured to transmit and receive data to and from the unit under test. In various embodiments, the interface test adaptor is reconfigurable for specific test applications or units under test. In various operational embodiments, as is discussed further below, the portable EEC tester 200 includes simulator outputs that provide precise pressure levels that can be input to an EEC. The EEC may thus be tested by disconnecting or isolating the EEC from the engine, using the simulator outputs as pressure inputs to the EEC and monitoring response of the EEC due to the various pressure inputs. In various embodiments, the simulator outputs may be provided to the ECC (or the unit under test) using hoses or conduits connecting the portable EEC tester 200 to the ECC or the unit under test.

As will be discussed further below, in various embodiments, the pressure simulator 202 is configured to provide pressure inputs, including both vacuum and non-vacuum pressure level inputs, to a unit under test. In various embodiments, the portable EEC tester 200 is configured to receive compressed gas from a source of compressed gas, such as a pressure tank 210. The pressure tank may be connected to the portable EEC tester 200 via a hose 212, which may be connected to the portable EEC tester 200 through a supply inlet 214. In various embodiments, the source of compressed gas is maintained at a pressure level of about 150 psia (1034 kPa). Throughout this specification, it should be appreciated that reference to a pressure level refers to absolute pressure, where an absolute pressure level is equal to a corresponding gauge pressure level plus atmospheric pressure. Thus, reference to a vacuum or to a vacuum pressure level generally refers to a pressure range from zero psia to atmospheric pressure and reference to a non-vacuum pressure level generally refers to a level above atmospheric. Similarly, reference to a low pressure generally refers to a vacuum (i.e., a pressure below atmospheric) while reference to a positive pressure or to a high pressure generally refers to a pressure above atmospheric. In various embodiments, the vacuum is generated by the pressure simulator 202 by a venturi 220 configured to receive high pressure air from the supply inlet 214. The high pressure air passes through a nozzle section within the venturi 220 that creates a source of low pressure.

Figure 3:
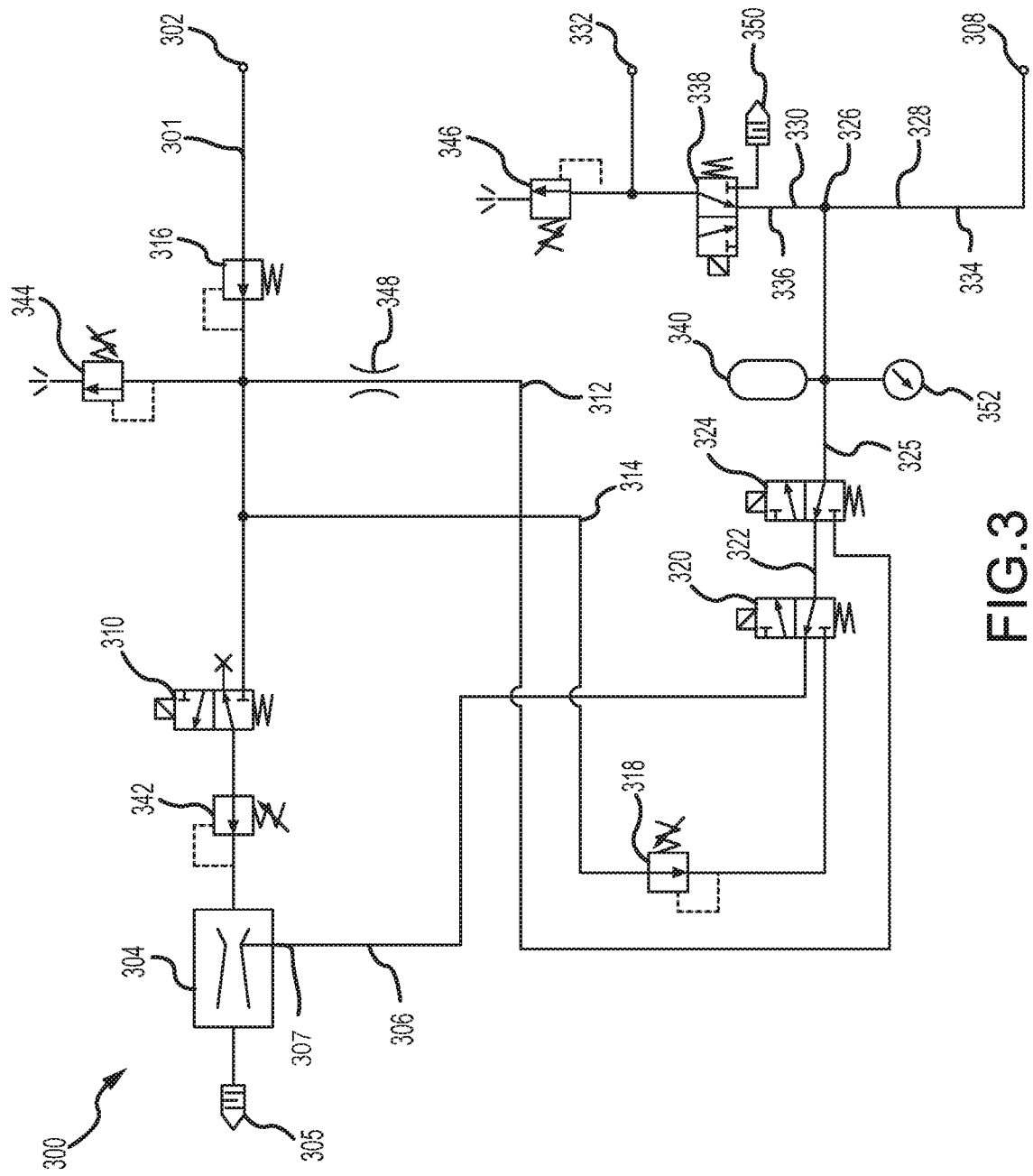
FIG. 3 illustrates a schematic diagram of a pressure simulator, in accordance with various embodiments.

Referring now to FIG. 3, details of a pressure simulator 300 are provided in schematic form, in accordance with various embodiments. In various embodiments, the pressure simulator 300 is configured for use with an EEC tester, such as the portable EEC tester 200 referred to above with reference to FIG. 2. The pressure simulator 300 includes a supply inlet 302, configured to receive a supply of compressed gas (e.g., compressed air) from a source, such as a compressor or a tank. A supply conduit 301 couples the supply inlet 302 to a venturi 304. The venturi 304 is configured to receive a flow of compressed gas from the supply inlet 302 and to provide a vacuum pressure level at a vacuum output 307. In various embodiments, the vacuum output 307 of the venturi 304 is directed to a vacuum conduit 306. As discussed further below, in various embodiments, the vacuum conduit 306 is selectively connected to a first simulator output 308 and configured to provide a vacuum as an output of the pressure simulator 300 at the first simulator output 308. The main flow through the venturi 304 may exit through a first muffler 305.

The pressure simulator 300 further comprises a first switch 310 positioned downstream of the supply inlet 302 and upstream of the venturi 304. The first switch 310 is configured to selectively connect the supply inlet 302 to one of the venturi 304 and the first simulator output 308. More specifically, when the first switch 310 is open, compressed gas flows along the supply conduit 301 from the supply inlet 302, through the first switch 310, and then to the venturi 304. When the first switch 310 is closed, the compressed gas is directed to flow from the supply inlet 302 to one or more of a first high pressure conduit 312 and a second high pressure conduit 314. In various embodiments, the first high pressure conduit 312 and the second high pressure conduit 314 separately connect the supply inlet 302 to the first simulator output 308.

In various embodiments, the pressure simulator 300 includes a first pressure regulator 316 positioned downstream of the supply inlet 302 and upstream of the venturi 304. A second pressure regulator 318 may be positioned downstream of the first pressure regulator 316 within the second high pressure conduit 314. In various embodiments, a second switch 320 may be positioned downstream of the second pressure regulator 318 and configured to selectively connect one of the vacuum conduit 306 and the second high pressure conduit 314 to the first simulator output 308 via a second switch output 322. In various embodiments, a third switch 324 may be positioned downstream of the second switch 320 and configured to selectively connect one of the second switch output 322 and the first high pressure conduit 312 to the first simulator output 308 via a third switch output 325. In various embodiments, a junction 326 may be positioned downstream of the third switch 324. A first branch 328 of the junction 326 connects to the first simulator output 308 via a first output conduit 334 and a second branch 330 of the junction 326 connects to a second simulator output 332 via a second output conduit 336. In various embodiments, a fourth switch 338 may be positioned between the junction 326 and the second simulator output 332. The fourth switch 338 may be configured to selectively open or close access to the second simulator output 332 via the second output conduit 336. A second muffler 350 is connected to the fourth switch 338 and configured to exhaust the flow circuit downstream of the fourth switch 338 when the fourth switch 338 assumes the closed position. In various embodiments, the pressure simulator 300 includes an accumulator 340. The accumulator 340 may be positioned downstream of the third switch 324. A pressure transducer 352 may also be positioned downstream of the third switch 324 for monitoring or adjusting precise values of the pressure levels at the first simulator output 308 and the second simulator output 332.

In various embodiments, the first pressure regulator 316 is set to regulate pressure of the compressed gas flowing from the supply inlet 302 to a first pressure level. The second pressure regulator 318 may be set to regulate pressure within the second high pressure conduit 314 to a second pressure level. In various embodiments, the first pressure level is set to a value greater than the second pressure level. In various embodiments, a third pressure regulator 342 may be positioned downstream of the of the first pressure regulator 316 and upstream of the venturi 304. The third pressure regulator 342 is set to regulate pressure upstream of the venturi 304 to a third pressure level, thereby providing an adjustment to the vacuum pressure level at the vacuum output 307. In various embodiments, the third pressure level is set intermediate the first pressure level and the second pressure level. The pressure simulator 300 may also include a first pressure relief valve 344 positioned downstream of the first pressure regulator 316 and a second pressure relief valve 346 downstream of the fourth switch 338. In various embodiments, a snubber 348 is positioned within the first high pressure conduit 312 downstream of the first pressure regulator 316 and upstream of the third switch 324. The snubber 348 damps pressure oscillations occurring within the pressure simulator 300 and, in particular within the first high pressure conduit 312 and the second high pressure conduit 314.

In various operating embodiments, the pressure level at the supply inlet 302 is set to about 150 psia (1034 kPa). The pressure level downstream of the first pressure regulator 316 is set to about 95 psia (655 kPa), the pressure level downstream of the second pressure regulator 318 is set to about 45 psia (310 kPa) and the pressure level downstream of the third pressure regulator 342 (and upstream of the venturi 304) is set to about 63 psia (434 kPa). The maximum pressure level upstream of the first pressure relief valve is limited to about 115 psia (792 kPa) and the maximum pressure level upstream of the second pressure relief valve 346 is limited to about 50 psia (344 kPa). In various embodiments, the venturi 304 and the first muffler 305 may comprise an AVR Vacuum Pump (Model AVR093H) with an S18 Muffler, available from Air-Vac Engineering, Seymour, CT. The pressure simulator 300, when operated using the AVR venturi and the foregoing pressure level settings, will generate output pressure levels at the first simulator output 308 of about 5 psia (34 kPa), 45 psia (310 kPa) and 95 psia (655 kPa) and the second simulator output 332 of about 5 psia (34 kPa) and 45 psia (310 kPa). The first simulator output 308 and the second simulator output 332 may be connected to inputs of an EEC, such as the EEC 100 described above with reference to FIG. 1, for testing the EEC.

Figure 4:
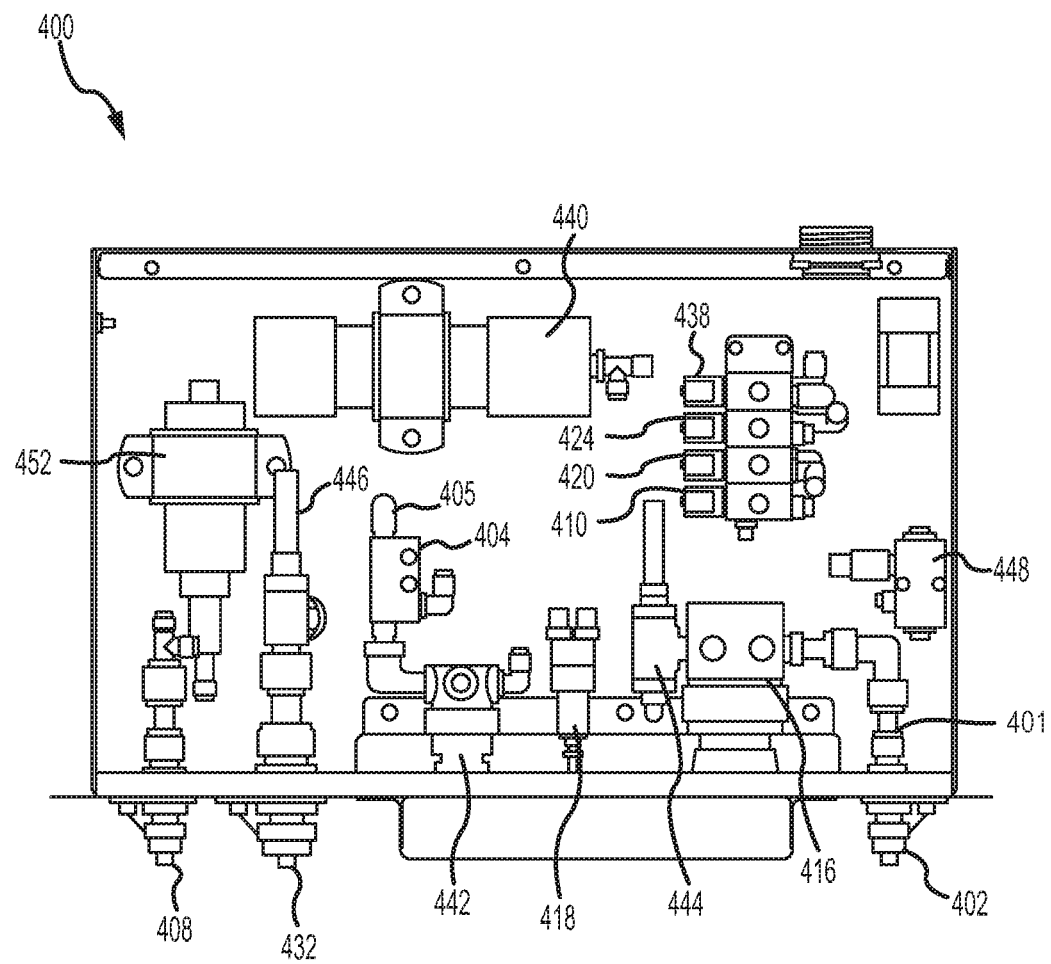
FIG. 4 illustrates an overhead view of the componentry of a pressure simulator, in accordance with various embodiments.

Referring now to FIG. 4, an overhead view of componentry included in a pressure simulator 400 is shown, according to various embodiments. The pressure simulator 400 includes a supply inlet 402, connected to a first pressure regulator 416 and a first pressure relief valve 444. Also included is a venturi 404 having a first muffler 405. A supply conduit 401 couples the supply inlet 402 to the first pressure regulator 416 and subsequently to the venturi 404. The venturi 404 is connected to a third pressure regulator 442. The pressure simulator 400 may further include a first simulator output 408 and a second simulator output 432. The second simulator output 432 is connected to a second pressure relief valve 446. The pressure simulator 400 may also include a second pressure regulator 418, a snubber 448, an accumulator and a pressure transducer 452. A bank of switches comprises a first switch 410, a second switch 420, a third switch 424 and a fourth switch 438. The bank of switches may be connected to the various componentry just described using standard plumbing conduit to produce a pressure simulator consistent with the schematic above described with reference to FIG. 3. In various embodiments, the venturi 404 and the first muffler 405 may comprise an AVR Vacuum Pump (Model AVR093H) with an S18 Muffler, available from Air-Vac Engineering, Seymour, CT.

The foregoing disclosure provides both a pressure simulator that may be used with a portable EEC tester and a portable EEC tester for use with testing control systems on gas turbine engines and various other engines operated by control systems. The pressure simulator is modular and may be operated without the requirement of having a vacuum pump; instead, the pressure simulator employs a compact venturi that provides the vacuum. The compactness of the portable EEC tester enables testing of EEC systems in locations otherwise not practical due to the size of the testing equipment. While the disclosure focuses above on gas turbine engines, it should be appreciated that the disclosure extends to engines and applications other than gas turbine engines.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pressure simulator, comprising
a supply inlet;
a venturi coupled to the supply inlet by a supply conduit, the venturi including a vacuum output;
a first simulator output coupled to the vacuum output by a vacuum conduit, wherein the venturi is configured to receive a flow of compressed gas from the supply inlet and to provide a vacuum to the first simulator output via the vacuum conduit;
a first switch positioned downstream of the supply inlet and upstream of the venturi, the first switch configured to selectively connect the supply inlet to one of the venturi and the first simulator output;
a first high pressure conduit connecting the supply inlet to the first simulator output;
a first pressure regulator positioned downstream of the supply inlet and upstream of the venturi;
a second high pressure conduit connecting the supply inlet to the first simulator output;
a second pressure regulator positioned within the second high pressure conduit and downstream of the first pressure regulator; and
a second switch positioned downstream of the second pressure regulator and configured to selectively connect one of the vacuum conduit and the second high pressure conduit to the first simulator output via an output of the second switch.

2. The pressure simulator of claim 1, further comprising a third switch positioned downstream of the second switch and configured to selectively connect one of the output of the second switch and the first high pressure conduit to the first simulator output via an output of the third switch.

3. The pressure simulator of claim 2, further comprising a junction downstream of the third switch and wherein a first branch of the junction connects to the first simulator output and a second branch of the junction connects to a second simulator output via a second output conduit.

4. The pressure simulator of claim 3, further comprising a fourth switch positioned between the junction and the second simulator output and wherein the fourth switch is configured to selectively open or close access to the second simulator output via the second output conduit.

5. The pressure simulator of claim 4, further comprising a pressure relief valve connected to the second output conduit downstream of the fourth switch.

6. The pressure simulator of claim 2, further comprising an accumulator downstream of the third switch.

7. The pressure simulator of claim 6, further comprising a snubber positioned in the first high pressure conduit.

8. The pressure simulator of claim 2, wherein the first pressure regulator is set to regulate pressure to a first pressure level and the second pressure regulator is set to regulate pressure to a second pressure level and wherein the first pressure level is greater than the second pressure level.

9. The pressure simulator of claim 8, further comprising a third pressure regulator positioned downstream of the of the first pressure regulator and upstream of the venturi, wherein the third pressure regulator is set to regulate pressure to a third pressure level and wherein the third pressure level is set intermediate the first pressure level and the second pressure level.

10. A portable apparatus for testing an electronic engine controller, comprising:
a housing;
a power supply module mounted within the housing;
an interface test adaptor mounted within the housing;
a pressure simulator mounted within the housing, comprising
a supply inlet,
a venturi coupled to the supply inlet by a supply conduit, the venturi including a vacuum output, and
a first simulator output coupled to the vacuum output by a vacuum conduit, wherein the venturi is configured to receive a compressed gas from the supply inlet and to provide a vacuum to the first simulator output via the vacuum conduit;
a first switch positioned downstream of the supply inlet and upstream of the venturi, the first switch configured to selectively connect the supply inlet to one of the venturi and the first simulator output;
a first high pressure conduit connecting the supply inlet to the first simulator output;
a second high pressure conduit connecting the supply inlet to the first simulator output;
a first pressure regulator positioned downstream of the supply inlet and upstream of the venture;
a second pressure regulator positioned within the second high pressure conduit and downstream of the first pressure regulator; and
a second switch positioned downstream of the second pressure regulator and configured to selectively connect one of the vacuum conduit and the second high pressure conduit to the first simulator output via an output of the second switch.

11. The portable apparatus of claim 10, wherein the first simulator output is configured to supply one of a vacuum input and a positive pressure input to a sensor of an electronic engine controller.

12. The portable apparatus of claim 11, further comprising a tank of compressed gas connected to the supply inlet.

13. A portable apparatus for testing an electronic engine controller of a gas turbine engine, comprising:
a housing;
a power supply module mounted within the housing;
an interface test adaptor mounted within the housing; and
a pressure simulator mounted within the housing, comprising
a supply inlet,
a venturi coupled to the supply inlet by a supply conduit, the venturi including a vacuum output,
a first simulator output coupled to the vacuum output by a vacuum conduit,
a first high pressure conduit connecting the supply inlet to the first output,
a first switch positioned downstream of the supply inlet and upstream of the venturi, the first switch configured to selectively connect the supply inlet to one of the venturi and the first simulator output,
a first pressure regulator positioned downstream of the supply inlet and upstream of the venturi,
a second high pressure conduit connecting the supply inlet to the first simulator output,
a second pressure regulator positioned within the second high pressure conduit and downstream of the first pressure regulator, and
a second switch positioned downstream of the second pressure regulator and configured to selectively connect one of the vacuum conduit and the second high pressure conduit to the first simulator output via an output of the second switch, wherein the venturi is configured to receive compressed gas from the supply inlet and to provide a vacuum to the first simulator output via the vacuum conduit and wherein the first simulator output is configured to supply one of a vacuum input and a positive pressure input to a sensor of an electronic engine controller.

\* \* \* \* \*